United States Patent [19]

McIntyre et al.

[11] Patent Number: 4,613,264
[45] Date of Patent: Sep. 23, 1986

[54] ANCHOR BOLT

[76] Inventors: Douglas O. McIntyre, The White Cottage, Heathfields, Royston, Hertfordshire; Robert W. Limbrick, 6 Meadow Rise, Bewdley, Worcester, both of England

[21] Appl. No.: 568,198
[22] PCT Filed: Jul. 28, 1982
[86] PCT No.: PCT/GB82/00234
§ 371 Date: Apr. 19, 1984
§ 102(e) Date: Apr. 19, 1984
[87] PCT Pub. No.: WO83/03645
PCT Pub. Date: Oct. 27, 1983

[30] Foreign Application Priority Data

Apr. 16, 1982 [GB] United Kingdom ............... 8211051

[51] Int. Cl.⁴ ............................................. F16B 13/06
[52] U.S. Cl. ........................................ 411/55; 411/42; 411/65
[58] Field of Search ....................... 411/24–28, 411/32, 42, 44–53, 55, 57, 60, 61, 65, 70–74, 341, 342

[56] References Cited

U.S. PATENT DOCUMENTS

| 1,265,866 | 5/1918 | Ackerman | 411/32 |
| 3,662,644 | 5/1972 | Flesch et al. | 411/32 |
| 4,056,037 | 11/1977 | McIntyre | 411/60 |
| 4,140,040 | 2/1979 | Modrey | 411/45 |
| 4,293,259 | 10/1981 | Liebig | 411/32 |
| 4,315,708 | 2/1982 | Liebig | 411/65 |

FOREIGN PATENT DOCUMENTS

| 3025816 | 2/1982 | Fed. Rep. of Germany | 411/65 |
| 2253161 | 6/1975 | France | 411/65 |
| 2321065 | 3/1977 | France | 411/65 |
| 2362299 | 3/1978 | France | 411/65 |

Primary Examiner—Thomas J. Holko
Assistant Examiner—Neill Wilson
Attorney, Agent, or Firm—Rines and Rines, Shapiro and Shapiro; Shapiro And Shapiro

[57] ABSTRACT

An anchor bolt for clamping an object tightly against a receiving surface comprises a threaded elongated anchor rod having a head, an expansion body threadedly received on the rod in spaced relation to the head, and an expansion sleeve on the expansion body that is expanded as the rod is threaded into the expansion body. The anchor rod extends through an outer sleeve between an abutment on the head and an abutment on the expansion body, and spacers, such as a coiled spring or further sleeves, are provided between the anchor rod and the outer sleeve. The bolt provides improved shear resistance and anti-vibration efficiency.

5 Claims, 7 Drawing Figures

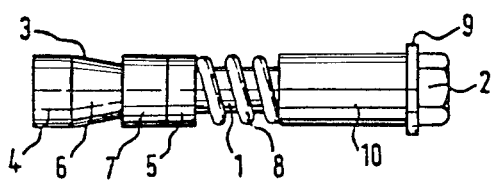
FIG.1.
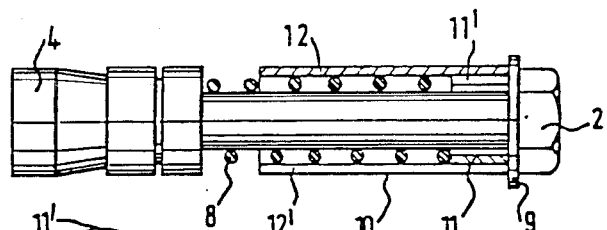
FIG.2.
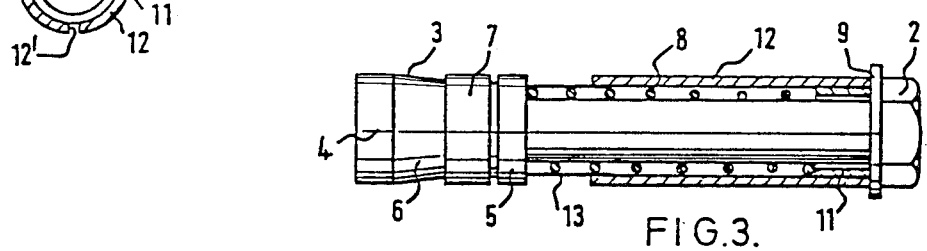
FIG.3.
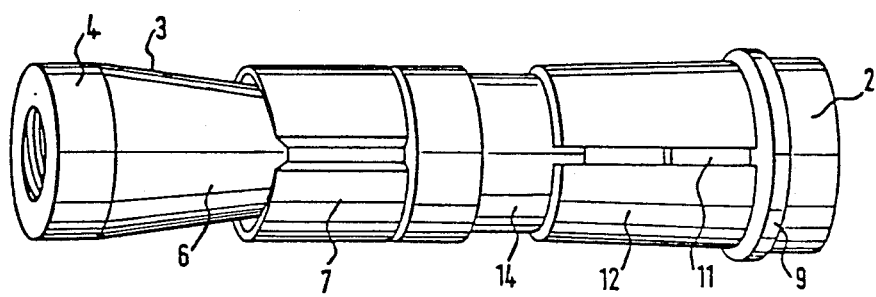
FIG.4.
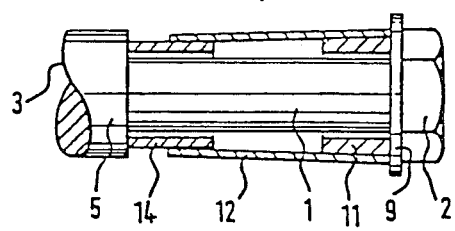

ANCHOR BOLT

FIELD OF THE INVENTION

The present invention relates to an anchor bolt for engagement in a socket in a receiving material, thereby to clamp an object, such as a profiled beam, to the material.

BACKGROUND ART

Such an anchor bolt normally comprises a threaded anchor rod which is provided with an expansion body at its threaded end on which is mounted an expandable sleeve, the body being structured so that as the anchor rod is moved axially of the expansible body, with the head of the rod in abutment with the object to be clamped, the sleeve is expanded into gripping contact with the socket.

It is known to position a tubular sleeve between the head of the anchor rod and the expansion body, the tubular sleeve occupying the space between the inner wall of the socket and the rod thus enabling the anchor bolt to withstand high shear loads.

In practice a hole of the required diameter is first drilled in the receiving material and the anchor bolt is hammered into the drilled hole through a correspondingly sized hole in the object to be clamped.

The anchor rod is then torqued-up thereby to set the anchor bolt. Once the required anchorage has been achieved further axial movement of the rod is impeded because the sleeve is in abutment both with the expansion body and the head of the anchor rod.

When this condition is achieved, no axially acting force component remains available to enable the object to be clamped to be pulled down against the receiving material.

SUMMARY OF THE INVENTION

It is an object of the invention therefore to remove the disadvantages of the prior art by providing an anchor bolt which while having the ability to withstand high shear loads, ensures that the object being clamped is pulled down against the bare material so that the fixing is able to withstand vibrational loads.

According to the invention there is provided an anchor bolt for engagement in a socket in a receiving material to clamp an object thereto and comprising a threaded anchor rod, an expansion body threadedly received on the rod, an expansible sleeve on the expansion body and expandable into gripping contact with the socket as the rod is moved axially therein to draw the body into the sleeve, an abutment on the expansion body and the head of the rod, at least one sleeve between the abutments in spaced relation with the rod and dimensioned to bridge or substantially bridge the abutments when the bolt is anchored in the socket and the object is pulled hard against the receiving material, and spacer means between the abutments on the rod over which the sleeve can slide during said axial movement of the rod to reduce the distance between the abutments such that the space between the sleeve and the rod is occupied or substantially occupied by said spacer means when the bolt is anchored in the socket.

This arrangement obviates the deficiencies of the prior art anchor in that the distance between the respective abutments progressively reduces from the moment the anchor rod is turned in the expansion body first to set the expansion sleeve to the required torque, and then to reduce further axially until the object to be clamped is brought firmly against the receiving material and the sleeve occupies or substantially occupies the distance between the abutments.

Due to the fact that the spacer means is between the outer sleeve and the anchor rod in the anchored or set position, a solid or substantially solid body is formed between the internal surface of the socket and the body of the anchor rod thereby providing the required ability to withstand high shear loads, while the induced load in the bolt from the torque tightening remains substantially to clamp down the fixture and hence maximise the anti-vibration efficiency.

Preferably the spacer means is a coiled spring held between the abutment on the expansion body and the rod head.

Alternatively the spacer means may comprise a pair of spacer sleeves one of which is press-fit within the outer sleeve and in abutment with the anchor head, the other spacer sleeve being arranged for slidable movement within the outer sleeve as the distance between the abutments is reduced.

The outer sleeve and the first and second spacer sleeves are preferably longitudinally split tubes, the second spacer sleeve abutting the abutment on the expansion body and of lesser outside diameter than the outside diameter of the first spacer sleeve which is positioned within the outer sleeve in press-fit engagement. Thus the outer sleeve assumes a tapering effect, with the maximum diameter of taper being adjacent the abutment at the head of the rod and of slightly greater diameter than the receiving socket.

In this way, with the anchor bolt fully tapped home in the socket prior to torquing-up, the outer sleeve is firmly engaged in the socket at the position of maximum taper so preventing the sleeve falling out of the socket when the anchor bolt is used in an overhead application, or if the rod is removed after the anchor has been set.

Other features and advantages of the present invention will become apparent from the description that follows.

BRIEF DESCRIPTION OF THE DRAWINGS

Embodiments of the present invention will now be described by way of example with reference to the accompanying drawings wherein:

FIG. 1 is a view of an anchor bolt according to an embodiment of the invention;

FIG. 2 is a cross-sectional view of an anchor bolt according to another embodiment of the invention and includes a sectional view through the split tube assembly of the bolt;

FIG. 3 is a cross-sectional view through an anchor bolt according to another embodiment of the invention;

FIG. 4 shows an anchor bolt according to a further embodiment of the invention and includes a cross-sectional view through the bolt;

BEST MODES OF CARRYING OUT THE INVENTION

Figure 5:
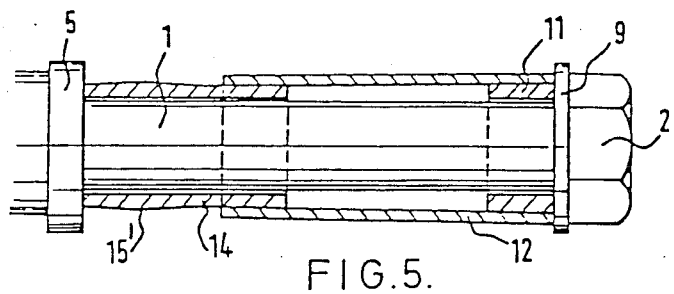
FIG. 5 shows a part cross-sectional view through an anchor bolt according to another embodiment of the invention.

The anchor bolt shown in FIG. 1 comprises a threaded anchor rod 1 having a head portion 2 shaped to enable torque to be applied to the rod when setting the anchor bolt.

An expansion body 3 is threadedly received on the anchor rod 1 and has a leading circular head portion 4, a trailing circular head portion 5 and a waisted portion 6 between the head portions 4 and 5 which tapers towards the head 2 of the anchor rod 1.

An expansible tubular split sleeve 7 is mounted on the waisted portion 6 and is of substantially the same diameter as the head portions 4 and 5.

The head portion 5, and the head 2 of the anchor rod 1, form abutments between which is held a coiled spring 8. Normally a washer 9 is interposed between the spring 8 and the head portion 2 as shown.

A plain tubular sleeve 10 of the same diameter as the portions 4 and 5 and sleeve 7, is mounted over a portion of the spring 8 and in abutment with the washer 9.

The anchor bolt as above described operates when used to clamp an object such as a profiled beam to receiving material, as follows.

A socket of the diameter of the head portions 4 and 5, the sleeve and the plain tube 10, is first drilled in a receiving material. A similar hole is drilled, or pre-drilled, through the object to be clamped.

The anchor bolt is then inserted through the hole in the object to be clamped and tapped home in the socket. Application of torque to the head 2 of the anchor 1 causes the expansion body 3 to be drawn axially of the anchor rod 1 thereby expanding the sleeve 7 into gripping contact with the socket to thereby set the anchor bolt. Axial movement of the expansion body 3 during this torquing-up action correspondingly reduces the distance between the head portion 5 and the end of the sleeve 10, and compresses the spring 8. The sleeve 10 is longitudinally dimensioned so that subsequent rotation of the anchor rod 1 in the expansion body 3 further reduces the distance between the sleeve 10 and the abutment 5 until the object to be clamped is firmly held against the receiving material, at which point, the end of the sleeve 10 is in contact with or preferably almost in contact with the abutment or head portion 5.

The combination of the sleeve 10 and the compressed spring 8, spaced between the sleeve and the shank of the anchor rod 1, in the set condition of the fixing provides the anchor with the ability to withstand high shear loads. This coupled with the fact that the object to be clamped is held firmly against the bare material provides all the advantages which the prior art does not possess.

Moreover since the sleeve 10 does not come into contact with the head portion 5 before the object to be clamped is firmly held against the receiving material, any torque loading applied to the anchor rod 1 in an effort to achieve this end, does not go to otherwise uselessly loading the sleeve 10 as with the prior art device, but rather to improve the gripping action of the anchor rod by introducing stress forces acting between the head of the anchor rod 1 and the expansion body 6 through the bare material and along the rod itself to the expansion body 3, and thus between it and the sleeve 7. In this way the anti-vibrational properties of the fixing as a whole are maximised.

The anchor bolt shown in FIG. 2 is a modification of the anchor bolt shown in FIG. 1, the modification being exemplified in the cross-sectional view of the bolt shown. In this example of the invention, as with the further embodiments to be described, those parts in common with the embodiment of FIG. 1 will be given like reference numerals.

Thus in FIG. 2 the coiled spring 8 abuts an inner longitudinally split tubular sleeve 11 interposed between the spring 8 and the washer 9.

The inner split sleeve 11 is in friction fit with an outer longitudinally split tubular sleeve 12 of greater longitudinal extent along the axis of the rod 1 than the inner sleeve 11, and positioned over the coiled spring 8.

The arrangement of the longitudinal splits 11' and 12' in the sleeves 11 and 12 is shown in the cross-sectional view through the split sleeve assembly in FIG. 2. The splits 11' and 12' are arranged to be diametrically opposed as shown although this is not essential.

The presence of the inner sleeve 11 while retaining the coiled spring 8 within the assembly, serves to fully support the bolt when in shear.

The splits 11' and 12' are introduced so that the sleeves 11 and 12 may be made from strip material and to improve the interference fit between the two sleeves since any variation in diameter is taken up by the induced resilience of the respective split sleeves.

In the embodiment of anchor bolt shown in FIG. 3, the whole of the coiled spring between the head portion 5 and the head 2 of the anchor rod 1 is enclosed. This is provided by adding an additional tubular inner split sleeve 13 for movement within the outer tubular split sleeve 12 in the embodiment of FIG. 2.

While this arrangement reduces the influence of grit entering between the coils of the spring 8, nevertheless due to the need to make the additional sleeve 13 of thin section so that the maximum diameter of the spring 8 and the thickness of the outer sleeve 13 may be retained, there is a tendency for the assembly to seize up during movement such that full travel can not be ensured.

The embodiment shown in FIG. 4 removes these dangers by dispensing with the coiled spring and introducing an additional inner longitudinally split tubular sleeve 14 movable within the outer tubular sleeve 12. This is shown clearly in the cross-sectional view shown in FIG. 4. The lengths of the sleeves 11 and 14 are such that when the anchor bolt is fully torqued-up and the object to be clamped is firmly against the receiving material, the sleeves 11 and 14 are in abutment, or substantially so, within the outer sleeve 12 thus introducing solidity between the wall of the socket and the anchor rod 1.

In the embodiment of FIG. 4 the additional sleeve 14 is of lesser diameter that the inner sleeve 11 such that the outer sleeve 12 forms a tapered configuration the tapering direction being towards the expansion body 3.

Additionally the diameter of the inner sleeve 11 is such that the diameter of the outer sleeve 12 at this point is a little greater than the diameter of the drilled receiving socket. In this way when the anchor bolt is tapped home in the socket the sleeve is held in friction grip in the socket so that it will not fall out of the socket in an overhead application, upon removal of the anchor rod 1.

While the arrangement of FIG. 4 ensures that a portion of the outer sleeve 12 is in friction fit with the socket, the modification shown in FIG. 5, while retaining the tapering properties of the outer sleeve 12, is designed so that the whole extent of the outer surface of the sleeve 12 is in friction fit with the receiving socket in the fully clamped position of the anchor bolt.

To this end the additional sleeve 14 of FIG. 4 is provided with a mid-section belled-out portion 15' so that as the outer sleeve 12 moves over the surface of the additional sleeve 14 it is wedged outwardly into gripping contact with the receiving socket.

Figure 6:
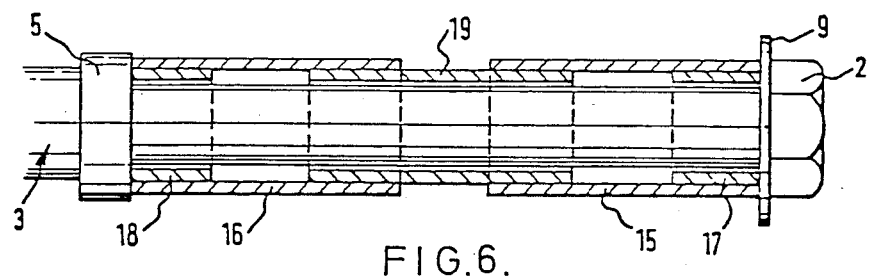
FIG. 6 is a cross-sectional view through an anchor bolt according to a still further embodiment of the invention.

Due to manufacturing restrictions the length to which the split sleeves of the anchor bolts as described hereinbefore may be made, is restricted. This restriction is overcome by the embodiment shown in FIG. 6.

This arrangement comprises two longitudinally split outer tubular sleeves 15 and 16 spaced from one another and each being in abutment respectively with the head 2 of the bolt 1 and the head portion 5 of the expansible body 3.

A shorter split inner tubular sleeve 17 is held in press-fit engagement at the end of the sleeve 15 and in abutment with the washer 9 or head 2 of the anchor rod 1, while a split inner tubular sleeve 18 of similar dimensions is held in press-fit engagement within the outer sleeve 16 and in abutment with the head portion 5.

A further split inner tubular sleeve 19 for sliding movement within the outer sleeves 15 and 16, is situated centrally between the head portion 5 and the washer 9 or head 2, as shown. The relative dimensions of the inner sleeves 17, 18 and 19 is such that with the bolt fully torqued-up and the object to be clamped held hard against the receiving material, the sleeves 15, 16 abut or substantially abut one another, and the sleeve 19 is both in abutment with the sleeves 17 and 18, thereby forming a solid or nearly solid piece of material between the receiving socket and the anchor rod 1.

The centrally situated inner sleeve 19 can be modified according to the sleeve 15' of the embodiment of FIG. 5 and of lesser diameter at its entrant portions into the sleeves 15 and 16, to provide the tapering effect of the sleeves 15 and 16 as required.

Figure 7:
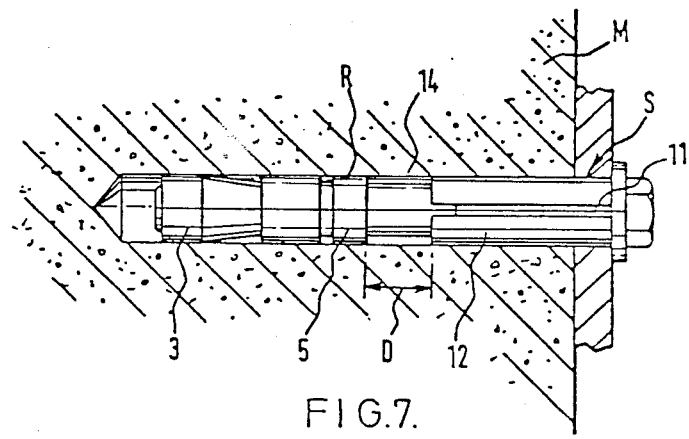
FIG. 7 shows the anchor bolt of FIG. 4 mounted in-situ and clamping an object to bare material.

An anchor bolt of the type as described in FIG. 4 is shown in-situ in FIG. 7. The position shown corresponds to an arrangement of anchor bolt parts, prior to torquing-up the anchor rod 1. Thus the anchor bolt has been tapped through the hole in the object to be clamped S, is received in the receiving socket R, and a distance D exists between the abutment formed by the expansion body 3 and the end of the outer sleeve 12. As the head 2 of the anchor rod 1 is turned the expansion body 3 moves axially up the anchor rod 1 to reduce the distance D while at the same time the sleeve 7 is moved into gripping contact with the socket R. When the required setting torque has been achieved the remaining application of effort to the anchor rod 1 forces the object to be clamped S into firm engagement with the receiving material M until the end of the outer sleeve 12 touches, or almost touches, the head portion 5 of the expansion body 3 at which time the inner sleeve 14 abuts, or nearly abuts, the inner sleeve 11.

The material used for the collapsible sleeve arrangements of the devices as above described may be made of a metal or of plastics.

Further other modifications and variations will be apparent to those skilled in the art which are clearly within the scope of the present inventive disclosure.

For example manufacturing limitations may be placed on the lengths of sleeves used in the fixings thereby limiting the lengths of the anchor bolt. To overcome this problem, the embodiments for instance shown in FIGS. 4 or 5, may be modified by dispensing with the sleeve 11 and having the sleeve 15 of the same length as the outer sleeve 12. Similar considerations apply to the FIG. 6 embodiment the main criterion being that throughout the dimensions of the respective sleeves are such that none of the effort imparted to the anchor to achieve a fully torqued-up condition, with the object to be clamped held fast against the bare material, is lost in loading the sleeves. This means that the sleeves must be free to slide relative to one another until the above-mentioned set conditions of the anchor bolt, are achieved.

We claim:

1. An anchor bolt for engagement in a socket in a receiving material to clamp an object thereto, comprising a threaded elongate anchor rod having a head, an expansion body threadedly received on the rod in spaced relation to the head and having expanding means drawn into an expansion sleeve to expand the sleeve into gripping contact with the socket as the rod is threaded into the expansion body, the expansion body and the head having opposed spaced abutments, an outer sleeve between said abutments extending around said rod in spaced relation thereto, said outer sleeve being dimensioned to bridge substantially the space between said abutments when said bolt is anchored in said socket and said object is pulled tightly against the receiving material, and spacer means on the rod between the rod and the outer sleeve, said outer sleeve being slidable over at least part of said spacer means during threading of the rod into said expansion body, whereby the space between the rod and the outer sleeve is substantially occupied by said spacer means when said bolt is anchored in said socket.

2. An anchor bolt as claimed in claim 1, wherein said spacer means comprises a coiled spring held between said abutment of said expansion body and said abutment of said rod head.

3. An anchor bolt as claimed in claim 1, wherein said spacer means comprises two spaced further sleeves, one of said further sleeves being press-fit within said outer sleeve for engagement, together with said outer sleeve, with the abutment of said rod head, the other of said further sleeves being arranged for slidable movement within the outer sleeve as the rod is threaded into said expansion body.

4. An anchor bolt as claimed in claim 3, wherein said one further sleeve is of greater diameter than said other further sleeve and wherein said outer sleeve is tapered, with the maximum diameter of taper being adjacent to the abutment of said rod head.

5. An anchor bolt as claimed in claim 4, wherein said other further sleeve has a longitudinally located belled-out portion for progressively straightening the taper of the outer sleeve as said rod is threaded into said expansion body.

* * * * *